United States Patent
Rose et al.

(10) Patent No.: US 12,038,295 B2
(45) Date of Patent: Jul. 16, 2024

(54) METHOD AND SYSTEM FOR PROVIDING A NAVIGATIONAL INSTRUCTION FOR A ROUTE FROM A CURRENT LOCATION OF A MOBILE UNIT TO A TARGET POSITION

(71) Applicant: Volkswagen Aktiengesellschaft, Wolfsburg (DE)

(72) Inventors: Kai-Christen Rose, Berlin (DE); Florian Klanten, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 121 days.

(21) Appl. No.: 17/625,289

(22) PCT Filed: Jun. 25, 2020

(86) PCT No.: PCT/EP2020/067961
§ 371 (c)(1),
(2) Date: Mar. 14, 2022

(87) PCT Pub. No.: WO2021/004809
PCT Pub. Date: Jan. 14, 2021

(65) Prior Publication Data
US 2022/0260382 A1 Aug. 18, 2022

(30) Foreign Application Priority Data
Jul. 8, 2019 (DE) .................... 10 2019 210 015.5

(51) Int. Cl.
*G01C 21/36* (2006.01)
(52) U.S. Cl.
CPC ................ *G01C 21/3602* (2013.01)
(58) Field of Classification Search
CPC ............ G01C 21/3602; G01C 21/20; G01C 21/3623; G06V 20/56; H04W 4/023; H04W 4/024
(Continued)

(56) References Cited

U.S. PATENT DOCUMENTS

2015/0185022 A1* 7/2015 Yoo ................. H04W 4/024
 701/408
2016/0265919 A1* 9/2016 Schuller ............ G01C 21/3602
(Continued)

FOREIGN PATENT DOCUMENTS

DE 102014002150 A1 7/2015 ............ B60W 30/06
WO 2021/004809 A1 1/2021 ............ G01C 21/20

OTHER PUBLICATIONS

International Search Report and Written Opinion, Application No. PCT/EP2020/067961, 10 pages.

*Primary Examiner* — Krishnan Ramesh
(74) *Attorney, Agent, or Firm* — Slayden Grubert Beard PLLC

(57) ABSTRACT

A method for providing a navigational instruction for a route from a current location of a mobile unit to a target position is disclosed. Location environmental data are detected in a first detection region by means of the mobile unit. Reference environmental data are detected in a second detection region. Based on the location environmental data and the reference environmental data, at least one common environmental feature is determined, wherein the common environmental feature is arranged both in the first detection region and in the second detection region. A relative arrangement of the mobile unit relative to the target position is determined and the navigational instruction is generated and output based on the relative arrangement. A system for providing a navigational instruction for a route from a current location of a mobile unit to a target position comprises a mobile detection unit, a reference detection unit, and a processing unit.

19 Claims, 3 Drawing Sheets

(58) Field of Classification Search
USPC .......................................................... 701/491
See application file for complete search history.

(56) References Cited

U.S. PATENT DOCUMENTS

| | | | | |
|---|---|---|---|---|
| 2018/0301031 | A1* | 10/2018 | Naamani | G01C 21/3685 |
| 2018/0365893 | A1 | 12/2018 | Mullins | |
| 2019/0213884 | A1* | 7/2019 | Kim | G01S 17/931 |
| 2020/0202566 | A1* | 6/2020 | Keserich | H04N 23/64 |
| 2020/0207333 | A1* | 7/2020 | Miller | G01C 21/3602 |
| 2020/0232809 | A1* | 7/2020 | Rogan | G06Q 10/047 |
| 2021/0088652 | A1* | 3/2021 | Stoschek | G01S 13/93 |
| 2022/0012469 | A1* | 1/2022 | Kucharski | G06V 20/20 |

\* cited by examiner

METHOD AND SYSTEM FOR PROVIDING A NAVIGATIONAL INSTRUCTION FOR A ROUTE FROM A CURRENT LOCATION OF A MOBILE UNIT TO A TARGET POSITION

CROSS-REFERENCE TO RELATED APPLICATIONS

This application claims priority to German Patent Application No. DE 10 2019 210 015.5, filed Jul. 8, 2019 with the German Patent and Trademark Office. The contents of the aforesaid Patent Application are incorporated herein for all purposes.

TECHNICAL FIELD

The present invention relates to a method and a system for providing a navigational instruction for a route from a current location of a mobile unit to a target position.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

An important field of application for mobile devices is navigation to specific destinations, in particular in unknown environments or when the destination is not precisely known to the user. Modern traffic concepts allow, for example, for autonomous vehicles to be requested and provided if necessary. In this case, the user neither knows the exact appearance of the vehicle nor its exact position or the route thereto. Conversely, the autonomous vehicle does not know the exact position of the user. In large cities, in particular, this produces new and very flexible starting situations, for example when the provided vehicle may only stop at a parking lot for a short period of time or when the visibility of the vehicle is limited by conditions that change with time.

Furthermore, there is the need to help people, for example those with impaired eyesight, a poor sense of direction, or in an unfamiliar environment, to find a target position and in particular a provided vehicle.

Known systems use, for example, special devices that are carried along by a target vehicle and that allow for navigation by means of said devices being located. Furthermore, satellite-based methods are used for position determination, but these often do not work in a sufficiently accurate manner in cities with a dense concentration of buildings.

SUMMARY

A need exists to provide a method and a system of the type mentioned at the outset which make it possible to provide navigational instructions with particularly efficient use of existing resources.

The need is addressed by a method and a system according to the independent claims. Embodiments of the invention are described in the dependent claims, the following description, and the drawings.

DESCRIPTION

Figure 1:
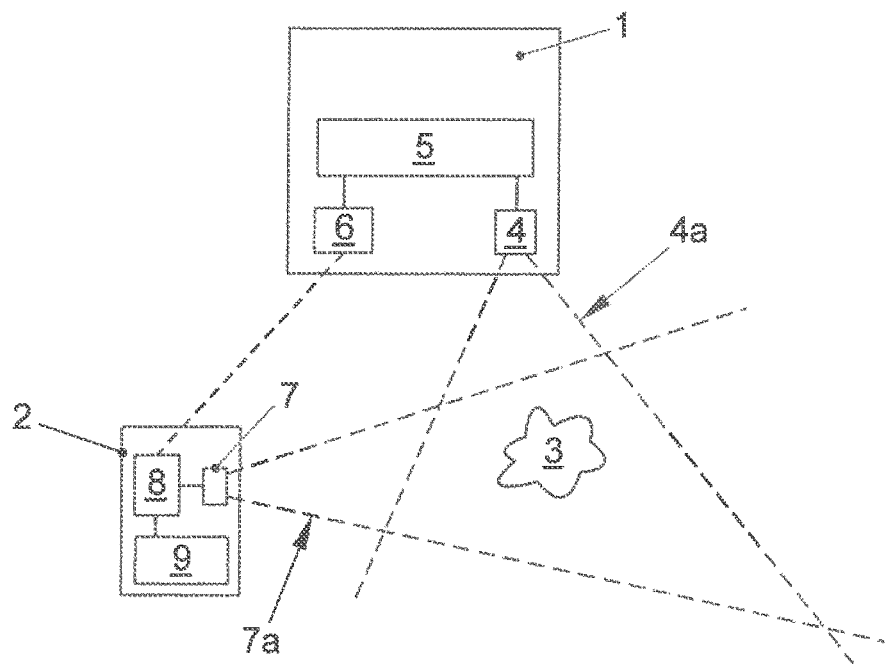
FIG. 1 shows an exemplary embodiment of a system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the method according to a first exemplary aspect for providing a navigational instruction for a route from a current location of a mobile unit to a target position, location environmental data are detected in a first detection region by means of the mobile unit. Reference environmental data are detected in a second detection region. Based on the location environmental data and the reference environmental data, at least one common environmental feature is determined. The common environmental feature is arranged both in the first detection region and in the second detection region. A relative arrangement of the mobile unit relative to the target position is determined and the navigational instruction is generated and output based on the relative arrangement.

The method uses data that may typically be detected by widely available units. For example, sensors of a vehicle and sensors integrated in a mobile telephone or other mobile device are used for perceiving the environment in order to detect the data required for the method.

The navigational instruction generated in the method is transmitted, in particular, to the mobile unit and output thereby. This output in particular takes place so as to be visually, acoustically, and/or haptically perceptible to a user. The navigational instruction is output such that the user may acquire information about a route from the current location to the target position. The navigational instruction may relate to the entire route or to a route section, in particular a section beginning at the current location. The output may for example include a map representation of a route and, if applicable, of features in the surroundings. Furthermore, said output may take place by means of an output unit that uses augmented reality, in particular with a view of the route that is displayed superimposed on a view of the surroundings.

In the method, the location and reference environmental data are in each case detected from a "perspective" with a starting position and an angle of detection. The relevant detection region is defined, in particular, by the starting position, the angle of detection, and the detection range. The detection range may for example depend on whether and how strongly detected signals are attenuated by influences in the environment, for example air, moisture, or concealing objects.

The method in particular exploits the fact that the location environmental data and the reference environmental data are detected such that the respective detection regions overlap with one another. In this region of overlap, the common environmental feature is determined and used to determine the relative arrangement of the mobile unit relative to the target position and to the common environmental feature.

The common environmental feature may, in principle, be any feature that may be recorded by means of suitable sensors and detected based on the environmental data, in particular a physical object that may be assigned a specific shape, color, position, or other attribute. Environmental features may for example be features of vegetation or buildings. Furthermore, the common environmental feature may include a course, marking, or other feature of a road or other passable route. Other examples of potential environmental features are road signs or signaling equipment, in particular in a particular state, or other road users. In other words, the arrangement of the common environmental feature may be static or change with time relative to an Earth coordinate system.

In the method, a position, orientation, or pose of an object, in particular, may be determined as an environmental feature based on the location and reference environmental data. In this case, the common environmental feature is detected depending on its position and orientation relative to the location of the mobile unit and to the target position from different perspectives. Subsequently, based on these different perspectives in the location environmental data and reference environmental data, the relative arrangement of the mobile unit to the target position is determined, in particular.

Unlike in known methods, here, the actual perspective and thus also the position are in particular taken into account during the detection of the reference environmental data and the relative arrangement is determined such that it also relates to the arrangement of the mobile unit relative to the target position or to the relevant position at which the reference environmental data are detected. Therefore, the way in which the environment with the common environmental feature appears from the perspective of the mobile unit at the current location is compared with the way in which it appears from the target position. The relative arrangement is then determined by means of a comparison. In contrast, in known methods, only environmental features are mapped and orientation only takes place relative to the positions of the individual environmental features.

For example, it is determined based on the location and reference environmental data that the mobile unit is located to the left of a specific row of houses, whereas the target position is to the right thereof. Furthermore, a distance or an angle may for example be determined. Then, the navigational instruction is generated based on this information relating to the arrangement of the mobile unit and the target position relative to one another.

In one embodiment, the reference environmental data are detected from the target position. As a result, the relative arrangement of the mobile unit relative to the target position may then be determined in a particularly simple manner.

In this case, the way in which the perspective of the location environmental data detected from the current location of the mobile unit differs from the perspective of the reference environmental data detected from the target position may be directly compared.

In another embodiment, the reference environmental data may alternatively or additionally be detected from positions other than the target position, for example by means of other detection units arranged in the surroundings. Such a case is conceivable, for example, if it is not sufficiently possible to detect the reference environmental data at the target position itself but there are detection units in the relevant surroundings. For example, there may be a plurality of video cameras and/or other sensors in a region, for example permanently installed detection apparatuses or other mobile units with suitable detection apparatuses. Such regions may for example include city centers, airports, theme parks, company premises, certain buildings, parking lots, parking garages, or traffic routes, in which cameras or other suitable sensors are arranged or in which there are other vehicles that are equipped with cameras or other sensors and whose data may be accessed, for example by means of car-to-car communication or another network. In this case, the arrangement of the target position relative to the apparatus by means of which the reference environmental data are detected is detected in particular, in order to be able to determine the relative arrangement of the mobile unit relative to the target position.

The mobile unit may for example be a mobile telephone or other mobile user device carried around by a user. In this case, the navigational instruction may be output such that it may be detected by the user and allows them to navigate to the target position. By way of example, a vehicle is at the target position.

The mobile unit may also be designed as another movable unit, for example a vehicle that is controlled in an at least partially automatic manner, in particular. In this case, the navigational instruction is output such that a control signal, for example, is generated such that the vehicle is navigated to the target position, for example to a waiting user. In the process, the vehicle is in particular automatically controlled by means of the control signal, or driving instructions, for example, are output to a human driver.

In one embodiment of the method, the mobile unit is a mobile user device of a user that comprises a camera, and a vehicle also equipped with a camera is located at the target position. The mobile user device may for example be a mobile telephone, a smartwatch, a tablet computer, or a device for virtual reality or augmented reality. Furthermore, a unit worn on the body of a user may be used, for example a pair of glasses with an integrated camera, a bodycam, or another device having a camera and/or other sensors and, if applicable, an output apparatus for outputting information to the user. Devices that help a user who is blind or with impaired eyesight to move around safely are conceivable, for example.

In one embodiment of the method, the location environmental data comprise image data. In particular, the reference environmental data may comprise image data. As a result, the environmental data may be evaluated in a particularly efficient manner.

The location and reference environmental data are detected in a manner known per se, for example by means of an image or video detection unit. Alternatively or additionally, other sensors may be used which detect environmental data by means of other physical interactions, for example by means of radar, lidar, ultrasound, infrared or ultraviolet light. In addition, inputs of a user may be evaluated and/or environmental data may be acquired via a data connection from an external apparatus, for example a server or an external detection unit.

In another embodiment of the method, the location environmental data comprise an initial position estimate and/or an orientation. Similarly, the reference environmental data may also comprise an initial position estimate and/or an orientation. As a result, it is possible to take into account during evaluation of the location and reference environmental data where the first and/or second detection region is approximately positioned.

The initial position estimate and/or orientation may for example be detected based on signals of a satellite navigation system, for example GPS, a compass, and/or a gyrometer.

In one embodiment, a detection request is generated and output based on the initial position estimate and/or orientation. The output may for example take place so as to be visually, acoustically, or haptically perceptible to a user or based on a control signal for controlling a detection unit.

The detection request comprises, for example, information relating to a particular direction in which the location and/or reference environmental data are to be detected. For example, a user is prompted to detect the location environmental data by orienting a camera of the mobile unit such that said data include a particular environmental feature, for example a particularly prominent structure, road signs, an element of the vegetation, or a specific road marking. Conversely, a camera for detecting the reference environmental data may for example be automatically pointed at a specific environmental feature. In this way, it is ensured, for example, that the first and second detection region overlap to a sufficient extent and that the common environmental feature is detected in an optimal manner. By way of example, the detection request may prompt the location environmental data to be detected within a specific angle, for example in that the user is prompted to rotate with a camera held in front of their body about their body longitudinal axis, or in that a camera holder is actuated such that it is pivoted at a certain angle.

In an embodiment of the method, request signals are generated for the location environmental data and/or the reference environmental data in an immediate temporal context and the location environmental data and/or the reference environmental data are detected depending on the request signals. As a result, the environmental data may be detected in a particularly targeted manner.

The request signals are generated, in particular, such that the immediate temporal context for detecting the location and reference environmental data is ensured, i.e., the location and reference environmental data are detected at coordinated points in time. In particular, the location and reference environmental data are detected at the same time or with a specific maximum time offset.

The request signals are generated, for example, in order to start the method and thus to initiate the detection of the location and reference environmental data. The request signals are in particular designed such that the detection of the location and reference environmental data is triggered, wherein the relative points in time of the detection, in particular, are established by means of the request signals. Furthermore, the request signals may be generated such that parameters for the detection of the location and reference environmental data are included, for example the extent to which the environmental data are detected or how the relevant detection region is formed, for example by stipulating a specific direction, range, detection angle, or sensor type.

The request signals are generated, in particular, by means of a unit at the target position, for example a vehicle located there, wherein, as a result, the detection of the reference environmental data is initiated by means of the unit at the target position itself and the detection of the location environmental data is initiated by means of the mobile unit. Furthermore, the mobile unit may be prompted to transmit the detected location environmental data to the unit at the target position.

In one embodiment, the request signals are designed such that the reference environmental data are detected such that the second detection region is formed depending on the detected location environmental data. Conversely, they may be formed such that the first detection region is formed depending on the detected reference environmental data. For example, a particularly distinctive environmental feature that is particularly well suited for orientation purposes may be identified. The first and/or the second detection region may then be formed, for example by means of a specific orientation of a detection unit or the selection of a specific sensor, such that the distinctive environmental feature is included in a particularly clear manner in the environmental data. This may be done by means of parameters for automatic detection of the environmental data or by means of a request to a user to detect the environmental data in a specific way. For example, an output with an orientation instruction is generated, wherein the user is prompted to point a camera of the mobile unit at a particular building, or a camera of a vehicle is set such that the particular building is detected.

In another embodiment of the method, the location environmental data and the reference environmental data are detected at a short time interval from one another, in particular a time interval of at most 2 h, or at most 30 min, or at most 2 min, or at most 30 s. As a result, a particularly close temporal link between the location and reference environmental data is established.

In the method, particularly up-to-date environmental data may be used in order, for example, to be able to take into account short-term influences of moving objects as well as changing light conditions, traffic situations, and weather conditions. In the method, moving objects may also be used as environmental features for orientation purposes, even if they are only at a specific position for a short period of time. In the navigation based on the common environmental feature, is it important that the environmental data were detected under comparable conditions. For example, environmental features may present very differently depending on the weather during which, time of day at which, and day of the week on which they are detected, whether a particular event is taking place in a region, and whether there are potentially temporary environmental features such as market stalls, barriers, signs, or groups of people, whether it is rush hour, or how a flow of traffic is regulated, which may for example result in a traffic jam. As such, the temporal relations between the location and reference environmental data must be known for the evaluation. The relative arrangement may also be determined based on moving environmental features, in particular if the location and reference environmental data are detected at practically the same time. Such moving environmental features may for example be road users. Similarly, changing states of environmental features may also be used, for example objects displayed by means of a display device, states of a traffic light system, or similar environmental features.

In one embodiment of the method, the location environmental data and/or the reference environmental data are detected within a region of a particular spatial environment surrounding the location or the target position, in particular within a radius of at most 1 km, or at most 500 m, or at most 100 m. As a result, it is ensured that the environmental data are detected within a relevant geographical region.

In particular, environmental data detected during a movement to a particular position are provided in this case. For example, a vehicle may detect reference environmental data while approaching a parking position, such that said data encompass a larger area surrounding the parking position. The reference environment may be formed such that they include environmental data that are detectable at a current point in time as well as environmental data previously detected in the spatial environment. In particular, the parking position is the target position and, in the method, a user is assisted during navigation from their current location to the target position or parking position of the vehicle by means of the mobile unit. Due to the fact that the reference environmental data relate to a larger area, the navigation may be improved and may in particular be made possible in the event that no common environmental features may be detected by means of the mobile unit and from the parking position at a current point in time.

In one embodiment of the method, the reference environmental data are detected at the target position and also stored in a memory unit at the target position, in particular in a vehicle located there. The location environmental data are detected at the current location by means of the mobile unit, optionally pre-processed, and transmitted to the target position, in particular to the vehicle. A local network may be used for this, for example by means of Bluetooth, WLAN, or another short-range wireless connection between a vehicle at the target position and the mobile unit. In this embodiment, the reference environmental data are not transmitted from the target position to another unit, but rather the reference environmental data remain in the vehicle located at the target position, for example. In this case, the further processing, in particular the determination of the common environmental feature and of the navigational instruction, also takes place at the target position. As a result, improved data protection and increased data security is ensured, since external apparatuses cannot access the reference environmental data detected at the target position.

In another embodiment of the method, the location environmental data and the reference environmental data are transmitted to a central processing unit, wherein the navigational instruction is generated by the central processing unit. The central processing unit is in particular an external unit, for example an external server. This makes it possible to process with high computing capacities and to store the data, in particular temporarily store same, in order, for example, to be able to provide additional environmental data from other units or other instances of the method in order to carry out the method. Additional measures for ensuring data protection and data security, in particular, are provided for this.

In one embodiment of the method, intermediate environmental data are detected in a third detection region at an intermediate position, wherein the relative arrangement of the mobile unit relative to the target position is also determined relative to the intermediate position. In particular, the first and third detection region overlap and the common environmental feature is determined within the overlapping subregion. This allows for "interrogation" of the mobile unit of the target position when the first and second detection region do not overlap, i.e., when no common environmental features are detected from the current location and from the target position.

For example, an initial location estimation is carried out for the mobile unit, for example by means of a user input or position determination by means of methods known per se. Subsequently, in this example, it is determined that no common environmental features may be detected, for example because obstacles prevent an overlap of the first and second detection region. An intermediate position is determined in which a suitable unit for detecting the intermediate environmental data, in particular, is located.

The intermediate environmental data detected at the intermediate positions may be transmitted to a central processing unit, which processes the environmental data and, in particular, determines the common environmental features. For example, the intermediate environmental data are transmitted to a vehicle at the target position, wherein the detection at the intermediate positions in this case serves as an extension of the detection options of the vehicle at the target position. Furthermore, the navigational instruction may be generated for a route from the current location of the mobile unit to the intermediate positions, wherein the generation is in this case carried out at the intermediate positions or by a unit located there. In particular, a car-to-car or car-to-infrastructure network is established or used in order to ensure transmission of the intermediate environmental data or additional data for providing the navigational instruction.

In another embodiment, an obstacle on a route from the current location to the target position is determined based on the location and/or reference environmental data and a warning message is generated and output. In particular, obstacles that are relevant to a user on foot are determined in this case, for example steps, slopes, objects protruding into the path, or other road users with whom there is a risk of collision. The obstacle is in particular determined and the message designed such that a user who cannot perceive the obstacle themselves, for example because of impaired vision, is warned.

In one embodiment, a visually perceptible information sign is output at the target position, the information sign is detected based on the location environmental data, and the navigational instruction is generated based on the information sign. This facilitates navigation since an apparatus at the target position may make itself known. By way of example, an active light signal may be generated, for example by means of projection onto surrounding surfaces or emission of light toward the current location, for example by means of light pulses of a particular color, intensity, frequency, or with a particular pulse pattern. In particular, a frequency range of light that is not perceptible to the human eye, for example infrared, is used. The information sign is in particular detected by means of the mobile unit based on the detected location environmental data and the mobile unit generates the navigational instruction. In particular, the mobile unit receives information about the information sign, in particular such that said unit may recognize the information sign. For example, the mobile unit receives information as to which information sign may be used to identify a vehicle located at the target position.

In another embodiment, calendar data of a user that are stored, in particular, in the mobile unit are detected, and an initial position estimate for the current location of the mobile unit is generated based on the calendar data. By way of example, the calendar data include location information and time information, in particular for events based on which the position of the mobile unit at a point in time is determined. For example, it may be determined that a user is located in a building in an exit region of the building after an event in order, for example, to wait for a requested vehicle.

A system for providing a navigational instruction for a route from a current location of a mobile unit to a target position comprises a mobile detection unit which is configured to detect location environmental data in a first detection region, a reference detection unit, which is configured to detect reference environmental data in a second detection region, and a processing unit, which is configured to determine at least one common environmental feature based on the location environmental data and the reference environmental data. The common environmental feature is arranged both in the first detection region and in the second detection region. The processing unit is also configured to determine a relative arrangement of the mobile unit relative to the target position and, based on the relative arrangement, to generate and output the navigational instruction.

This system is in particular designed to implement the above-described method. The system thus has the same benefits as the described method.

The system in particular comprises a vehicle which is located at the target position and in which the reference detection unit, in particular, is integrated. The mobile unit may be a mobile device carried around by a user, for example a mobile telephone, in which the mobile detection unit, in particular, is integrated.

In another embodiment, the system comprises an output unit, which is configured to output the navigational instructions in a visually, acoustically, and/or tactually perceptible manner. The output unit is in particular integrated in the mobile unit, for example with a display, loudspeaker, or vibration unit. The output may for example be output by means of a mobile telephone, an apparatus arranged on the body of the user, on a walking aid or a blind person's cane having a corresponding output unit.

The invention will now be explained based on further exemplary embodiments with reference to the drawings. Specific references to components, process steps, and other elements are not intended to be limiting. Further, it is understood that like parts bear the same or similar reference numerals when referring to alternate FIGS.

An exemplary embodiment of the system will now be explained with reference to FIG. 1.

A vehicle 1 comprises a processing unit 5, to which a reference detection unit 4 and an interface 6 are coupled. In the exemplary embodiment, the reference detection unit 4 comprises a camera, which is designed in a manner known per se and which comprises a first detection region 4a. In other exemplary embodiments, the reference detection unit 4 alternatively or additionally comprises other sensors, for example a stereo camera, a time-of-flight camera, a lidar, radar, or ultrasound sensor, or an infrared camera.

A mobile unit 2, designed as a mobile telephone 2 in the exemplary embodiment, also comprises a processing unit 8, to which a mobile detection unit 7 and a display unit 9 are coupled. The mobile detection unit 7 of the mobile telephone 2 is also designed as a camera, which comprises a second detection region 7a. Analogously to the reference detection unit 4, also the mobile detection unit 7 may alternatively or additionally comprise other sensors. In the exemplary embodiment, a user carries the mobile telephone 2 along with them. Said user holds it such that the first detection region 4a of the reference detection unit 4 and the second detection region 7a of the mobile detection unit 7 overlap and both encompass a common environmental feature 3—a tree 3 in this exemplary embodiment.

In the exemplary embodiment, a direct connection may be established between the interface 6 of the vehicle 1 and the processing unit 8 of the mobile telephone 2, wherein a method known per se is used to establish a data connection, for example WLAN or Bluetooth. In other exemplary embodiments, the vehicle 1 and/or the mobile telephone 2 also has a connection to another network, in particular to an external unit or an external server, or the connection between the interface 6 and the processing unit 8 is indirectly established via another network.

An exemplary embodiment of the method will now be explained with reference to FIG. 1. The above-explained exemplary embodiment of the system will be taken as the basis for this and will be specified in more detail by means of the description of the method.

The user starts the method for assisting with navigation from their current location to the vehicle 1 parked at a target position. The reference detection unit 4 of the vehicle 1 and the mobile detection unit 7 of the mobile telephone 2 detect reference environmental data and location environmental data in the respective detection regions 4a, 7a in a substantially simultaneous manner. In the exemplary embodiment, the location environmental data detected by the mobile telephone 2 are transmitted directly via the interface 6 to the vehicle 1, wherein a pre-processing step is optionally performed, in particular in order to reduce the quantity of data to be transmitted.

Based on the reference and location environmental data, the processing unit 5 of the vehicle 1 performs a processing step in order to determine common environmental features. Here, the tree 3 is identified as a common environmental feature 3. Based on the reference and location environmental data, the pose, i.e., the position and orientation, of the mobile unit 2 at the location and of the vehicle 1 at the target position relative to the tree 3 and relative to one another is determined. In the process, a distance and an angle with respect to the tree 3 are determined. Furthermore, the orientation of the relevant detection unit 4, 7 relative to the tree 3 is determined, which allows for determination of the orientation of the vehicle 1 and of the mobile telephone 2 if the orientation of the respective detection units 4, 7 relative to the vehicle 1 and to the mobile telephone 2 are assumed to be known. Based on this information, the relative arrangement of the vehicle 1, mobile telephone 2, and tree 3 relative to one another is also determined.

In other exemplary embodiments, the common environmental feature 3 takes another form. For example, a building façade, a truck or other road user, road signs, an infrastructure installation, or another environmental feature may be used. Furthermore, combinations of various environmental features or types of environmental feature may be taken as the common environmental feature.

In the exemplary embodiment, other route-relevant information is also determined based on the reference and location environmental data, wherein suitable paths are determined, in particular in the surroundings of the current location. In the process, obstacles that are in particular relevant to walking along the identified paths are also determined. In another exemplary embodiment, an initial position estimate is detected for the current location and/or for the target position, wherein methods known per se are used for determining the position, for example GPS. Based on this initial position estimate, map data and other information may be detected and used as route-relevant information.

A navigational instruction is then generated based on the relative arrangement and, if applicable, other route-relevant information, transmitted to the mobile telephone 2, and output by means of the display unit 9. Depending on the information available and the relevant traffic situation, the navigational instruction is generated such that the user is assisted with orienting themselves and moving to the vehicle 1 by means of the mobile telephone 2. The navigational instruction may be designed such that it comprises a directional instruction by means of which, for example, the direction to the vehicle 1 at the target position or to a walkable path is displayed. Furthermore, the navigational instruction may comprise one or more movement instructions, for example a request to move in a particular direction, to turn round, to turn off, or to change viewing direction.

In the exemplary embodiment, a warning message is also output if an obstacle has been detected on the way from the location to the target position.

In another exemplary embodiment, the display unit 9 of the mobile telephone 2 outputs an instruction by means of which the user is prompted, for example, to pivot the mobile detection unit, in order to orient the mobile detection unit 7 of the mobile telephone 2, and to find or better detect common environmental features. This changes the detection region 7a of the mobile detection unit 7, in particular. Equally, the reference detection unit 4 of the vehicle 1 may be oriented or adjusted such that its detection region 4a is changed or a parameter of the detection is adjusted.

In other exemplary embodiments, the navigational instruction may alternatively or additionally be acoustically perceptible by means of voice output and/or haptically perceptible by means of a vibration.

Exemplary embodiments of the method will now be explained with reference to FIGS. 2 to 6 based on various situations. The above-explained exemplary embodiment of the system will be taken as the basis for this and will be specified in more detail by means of the description of the method. The method is carried out substantially as described above with reference to FIG. 1. Therefore, in the following, not all method steps will be repeated, but rather different or new features will predominantly be explained. In FIGS. 2 to 6, comparable apparatuses and objects are provided with the same reference numerals.

Figure 2:
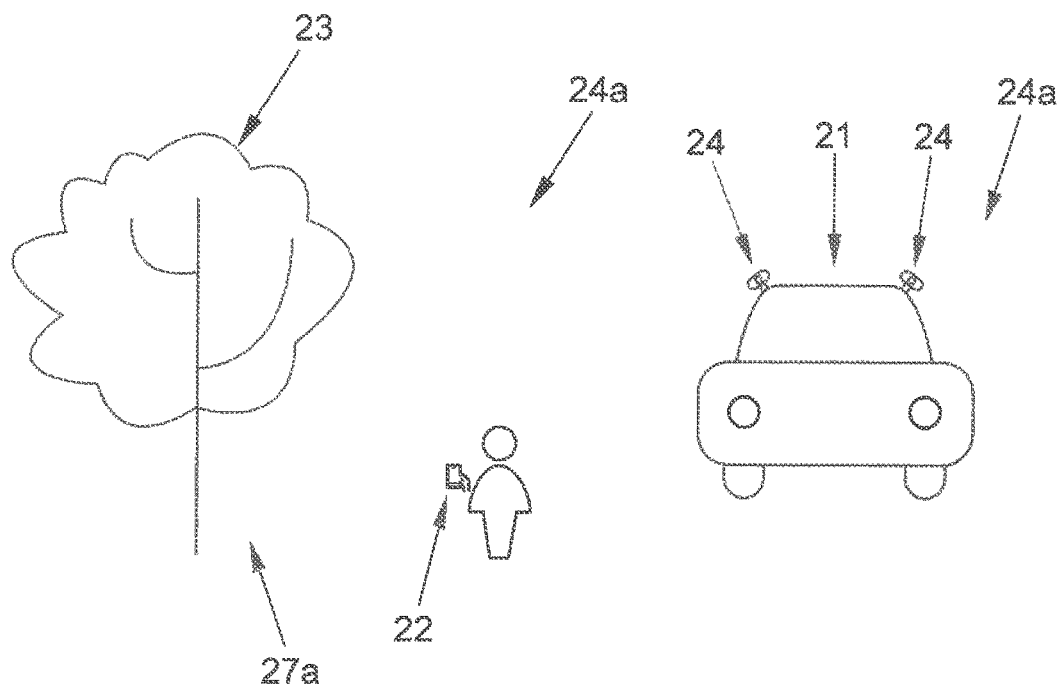
FIGS. 2 to 6 show examples of situations for applying an exemplary embodiment of a method.

In the case shown in FIG. 2, a vehicle 21 is at a target position and a user with a mobile telephone 22 is at a current location. The vehicle 21 comprises a detection unit 24 having two cameras, by means of which reference environmental data may be detected in a first detection region 24a. The mobile telephone 22 also comprises a camera (not shown), by means of which location environmental data may be detected in a second detection region 27a. The first 24a and second detection region 27a overlap and a tree 23 is located in the overlapping region. In other exemplary embodiments, the detection unit 24 and/or the mobile unit 22 may comprise a different number of cameras and/or other sensors.

During implementation of the exemplary embodiment of the method, firstly, request signals are generated, based on which the detection unit 24a of the vehicle 21 detects reference environmental data and the camera of the mobile telephone 22 detects location environmental data. In the process, it is ensured that the environmental data are detected as simultaneously as possible. In another exemplary embodiment, a time delay of at most 2 h, at most 30 min, at most 2 min, at most 30 s is permitted between detection of the reference environmental data and detection of the location environmental data.

The location environmental data detected by the mobile telephone 22 are transmitted to the vehicle 21, and the tree 23 is determined as a common environmental feature additionally taking into account the reference environmental data. Furthermore, it is determined that the current location of the mobile telephone 22, as shown in FIG. 2, is between the vehicle 21 and the tree 23 and that the camera of the mobile telephone 22 is pointing away from the vehicle 21. It is assumed that the user of the mobile telephone 2 is also oriented in the same direction, for example in terms of their viewing direction, and that this direction is understood by the user to be a "straight-ahead" direction forward.

A navigational instruction is generated and output by means of a display of the mobile telephone 22, wherein the user is prompted to turn and move toward the vehicle. In the exemplary embodiment, the navigational instruction is also output so as to be acoustically perceptible by means of voice output and so as to be haptically perceptible by means of vibrations in accordance with a particular defined signal code. For example, an acoustic instruction is output for the user to turn about their axis until a vibration is output. In another example, a changing acoustically or haptically perceptible signal is output such that it outputs the distance to the entry point of the vehicle 21, for example by means of a change in pitch, volume, frequency, and/or intensity of the signal.

Figure 3:
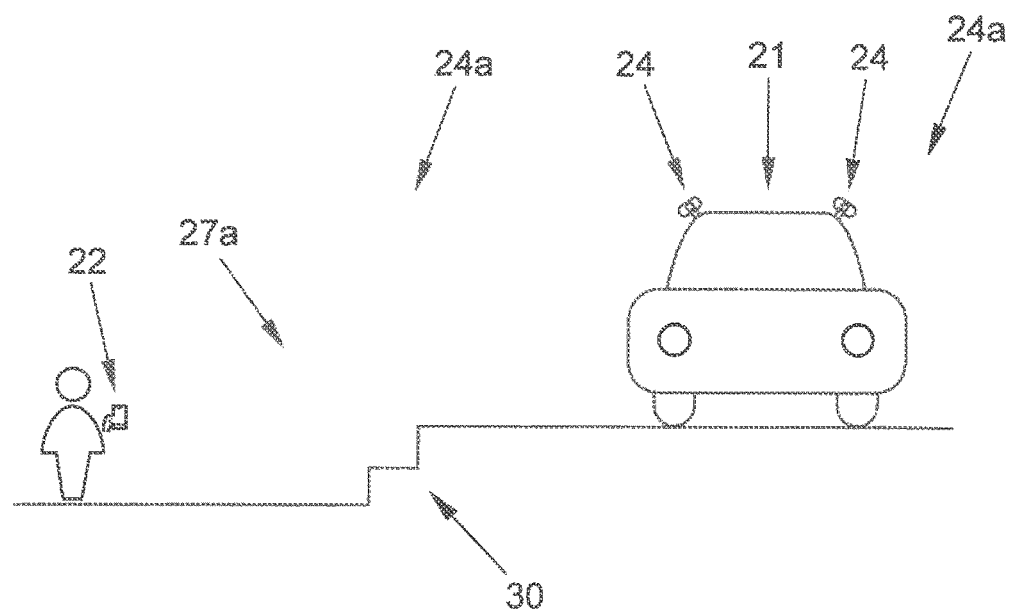

In the case shown in FIG. 3, the user points the mobile telephone 22 comprising the camera at the vehicle 21. Steps 30 are arranged between the user and the vehicle 21. Said steps are detected in the detection region 27a of the camera of the mobile telephone and identified as an obstacle on the way from the current location of the user to the vehicle 21.

The method is substantially carried out as described above, wherein the steps 30 are determined as a common environmental feature and are used to determine the relative arrangement of the user and the vehicle 21, provided that they are also detected by the detection unit 24 of the vehicle 21. In addition to the navigational instruction, a warning message is generated and output, by means of which the user is alerted of the position of the steps 30. A user with impaired eyesight or mobility problems may thus react to the presence of the steps 30. In other exemplary embodiments, an alternative path, for example barrier-free access, from the user to the target position is determined based on the location and/or reference environmental data and, if applicable, relevant available map data and then output, wherein the steps 30 are circumvented as an obstacle.

Figure 4:
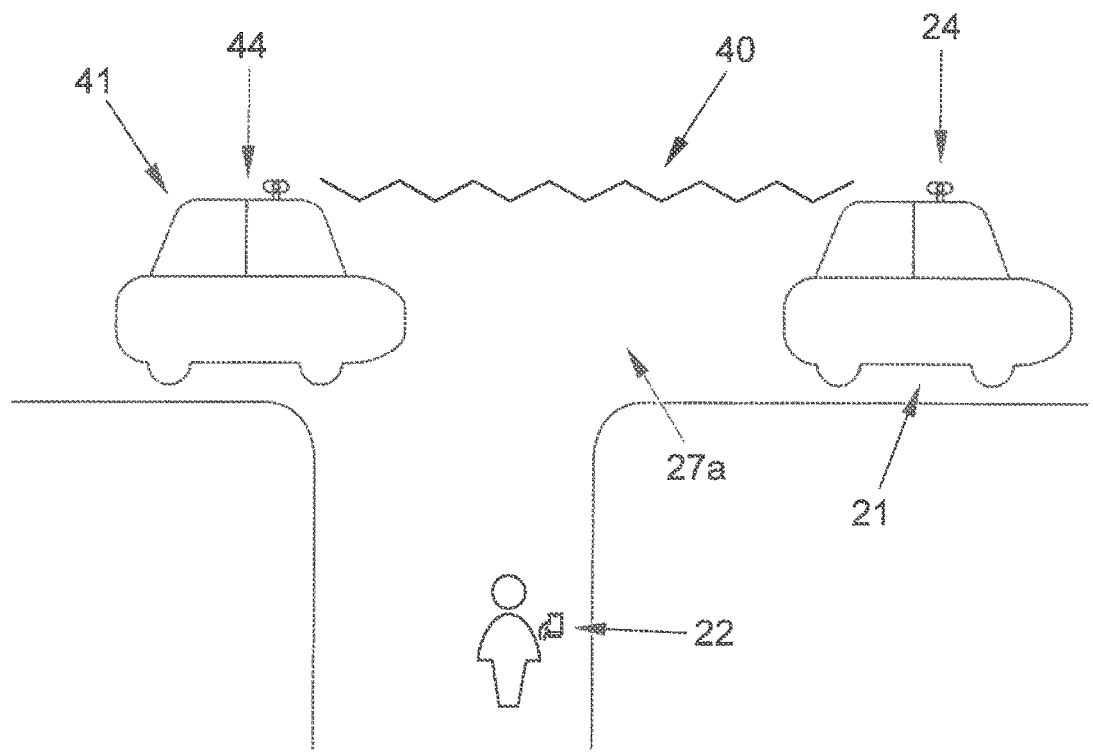

In the case shown in FIG. 4, the vehicle 21 is located at the target position in a region that is not visible to the user with the mobile telephone 22 and that is hidden behind a house corner. Moreover, it is assumed that no environmental data may be detected in overlapping regions. In this exemplary embodiment, a data connection 40 is established from the vehicle 21 to another vehicle 41, for example by means of Bluetooth, WLAN, or car-to-car technology, wherein the other vehicle 41 comprises another reference detection unit 44. It is assumed that data may be detected by means of the reference detection unit 44 of the other vehicle 41 in a detection region which overlaps with the detection region 27a of the camera of the mobile telephone 22, such that common environmental features may be determined.

In this exemplary embodiment, the navigational instruction is initially generated such that the user is guided to an intermediate position, in particular the location of the other vehicle 41, before said user is guided from there to the target position of the vehicle 21. Furthermore, the user may be guided toward the intermediate positions until said user is in a region in which the environmental data may be detected such that common features may be detected both by the mobile telephone 22 and by the vehicle 21 using the detection unit 24 thereof.

In another exemplary embodiment, the additional reference environmental data detected by the other vehicle 41 are fused with the reference environmental data detected by the vehicle 21 in order to thus enlarge the available detection region for the reference environmental data virtually with the aid of an external detection unit.

The navigational instruction may then be formed and output such that the user is indicated a route directly to the vehicle 21 at the target position without heading for an intermediate position first.

In another exemplary embodiment, other external detection units may be used, for example traffic monitoring apparatuses, security cameras, suitable mobile devices, or other units that may be connected to the vehicle 21 for data transfer by means of car-to-infrastructure or car-to-X technology, for example.

In other exemplary embodiments, no detection unit is available at the target position, but rather other detection units are exclusively used for detecting the reference environmental data. This may be used, in particular, in regions comprehensively monitored by sensors, in particular video cameras, for example in airports, private or company premises, theme parks, and/or in accordingly equipped vehicle parking facilities. The method may also be used to transmit a location estimate to the mobile unit 22 as an alternative or in addition to the navigational instruction.

In particular, an initial position estimate is generated for the current location of the mobile telephone 22 and/or the target position with the vehicle 21, for example by means of GPS or by means of an input of a user. Based on this information, suitable other vehicles 41 or other apparatuses for detecting environmental data are determined, a data connection 40 is established, and the required data are detected and transmitted.

In another exemplary embodiment, initial position estimates are detected for the mobile unit 22 and the target position, i.e. the vehicle 22, for example, and the relative arrangement is optimized proceeding herefrom by means of the method.

Figure 5:
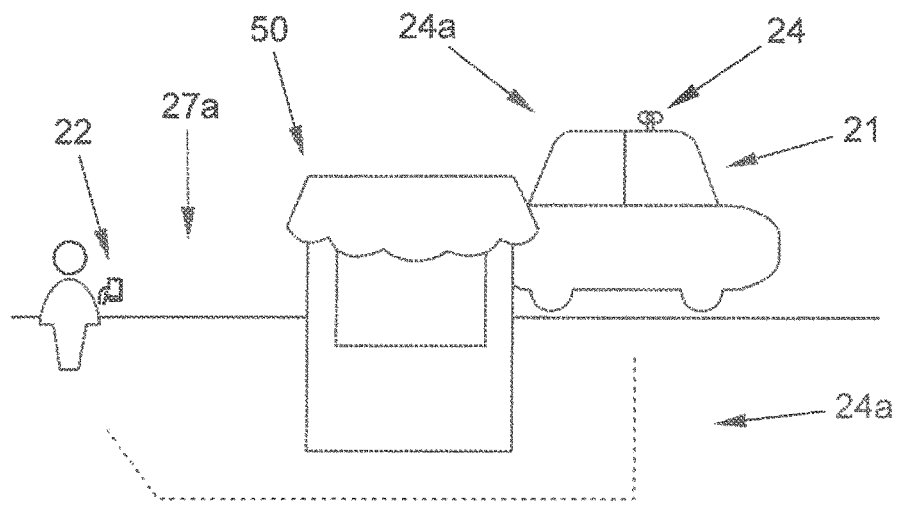

In the case shown in FIG. 5, a temporary barrier 50 is located between the mobile telephone 22 of the user and the detection unit 24 of the vehicle 21, said temporary barrier in this case being a market stall 50 that is only arranged at this position at particular points in time. In other exemplary embodiments, a temporary barrier 50 may for example also be a delivery vehicle or other road user.

In the exemplary embodiment, it is detected based on the detected location and reference environmental data that the mobile telephone 22 is located on another side of the market stall 50 to the vehicle 21. Based on the detected environmental data and, if applicable, available map data, a route on which the user arrives at the vehicle 21 bypassing the market stall 50 is determined and output.

Figure 6:
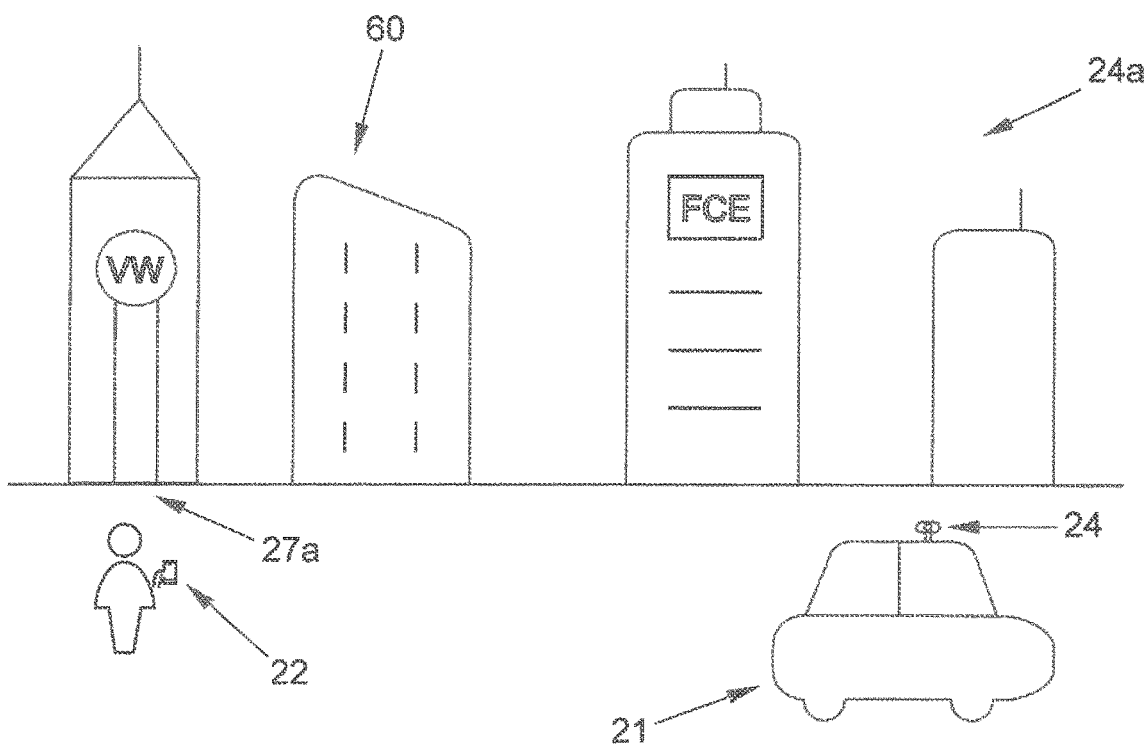

In the case shown in FIG. 6, the user with the mobile telephone 22 and the vehicle 21 are in front of a building front 60 on which signs with combinations of letters are arranged. Alternatively or additionally, practically any desired lettering, logos, inscriptions, or forms of advertising may be provided. These may be identified based on the detected location and reference environmental data and be used to determine the relative arrangement. The signs may be represented in a flexible manner, for example by means of a display surface or a dynamic advertising surface. In the method, display devices in the surroundings of the vehicle 21 may also be actuated such that particular environmental features, for example in a parking garage, are output in order to facilitate the search for specific destinations.

In another exemplary embodiment, the vehicle 21 or another apparatus at the target position emits a light signal. The light signal is located based on the detected location environmental data and used to determine the arrangement relative to the target position. In the process, information about the light signal that allows for identification of the light signal is in particular transmitted to the mobile telephone 22. For example, the light signal is designed having a particular color, duration, or as a particular sequence of longer and shorter signals, and may thus be assigned to a particular target position. The mobile telephone 22 then receives, in particular, information about the light signal in order to be able to identify same and to be able to distinguish it from other signals. Similarly, symbols may be displayed on a screen or a particular color and/or graphical representation may be output on a surface. A light signal may also be generated in the infrared range, wherein, in this case, a suitable detection unit must be used while the light signal may be emitted in a very discreet manner.

For example, a display may be provided at the target position, for example in the vehicle 21, which display is actuated so as to emit a light signal, for example a character string, a graphical object, or a symbol. The mobile unit 22 may then receive information as to which light signal should be navigated to.

In the description given above, it has predominantly been assumed that the vehicle 1, 21 is located at the target position. However, this does not have to be the case in general, and therefore navigation to the vehicle 1, 21 may always be understood as navigation to the target position. Similarly, the mobile unit 2, 22 does not necessarily have to be a mobile telephone 2, 22, but rather the method may in principle be carried out using any desired mobile units.

LIST OF REFERENCE NUMERALS

1 Vehicle
2 Mobile unit; mobile telephone
3 Environmental feature; tree
4 Reference detection unit
4a First detection region (vehicle)
5 Processing unit (vehicle)
6 Interface
7 Mobile detection unit
7a Second detection region (mobile telephone)
8 Processing unit (mobile telephone)
9 Display unit (mobile telephone)
21 Vehicle
22 Mobile telephone
23 Tree
24 Detection unit (vehicle)
24a First detection region (vehicle)
27a Second detection region (mobile telephone)
30 Obstacle; step
40 Data connection
42 Other vehicle
44 Reference detection unit (vehicle)
50 Temporary barrier; market stall
60 Building front The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for assisting a locating of a target position remote from a mobile unit carriable by a person, comprising:

detecting location environmental data in a first detection region using a first sensor of the mobile unit;
detecting reference environmental data in a second detection region using a second sensor provided at the target position remote from the mobile unit;
wherein the location environmental data and the reference environmental data are detected at the same time or within a specified maximum time offset;
based on the location environmental data and the reference environmental data, determining a common environmental feature, wherein the common environmental feature is arranged in a region of overlap of the first detection region and in the second detection region;
wherein the location environmental data defines a first appearance of the common environmental feature from a first perspective defined by a first angle of detection from the mobile unit to the common environmental feature;
wherein the reference environmental data defines a second appearance of the common environmental feature from a second perspective defined by a second angle of detection from the target position to the common environmental feature;
determining a relative arrangement of the mobile unit relative to the target position remote from the mobile unit based at least on a comparison of (a) the first appearance of the common environmental feature from the first perspective defined by the first angle of detection with (b) the second appearance of the common environmental feature from the second perspective defined by the second angle of detection; and
generating and outputting to the person a navigational instruction based on the relative arrangement, the navigational instruction specifying a route from a current location of the mobile unit to the target position.

2. The method of claim 1, wherein the location environmental data comprise image data.

3. The method of claim 2, comprising:
generating request signals for the location environmental data and the reference environmental data in an immediate temporal context; and
detecting the location environmental data and the reference environmental data depending on the request signals.

4. The method of claim 1, wherein the location environmental data comprise one or more of an initial position estimate and an orientation.

5. The method of claim 1, comprising:
generating request signals for the location environmental data and the reference environmental data at the same time or within the specific maximum time offset; and
detecting the location environmental data and the reference environmental data depending on the request signals.

6. The method of claim 1, wherein one or more of the location environmental data and the reference environmental data are detected within a region of a particular spatial environment surrounding the location or the target position.

7. The method of claim 1, comprising:
transmitting the location environmental data and the reference environmental data to a central processor; wherein
the navigational instruction is generated by means of the central processor.

8. The method of claim 1, comprising:
detecting intermediate environmental data in a third detection region at an intermediate position; and
determining the relative arrangement of the mobile unit relative to the target position relative to the intermediate position.

9. The method of claim 1, wherein the location environmental data comprise image data captured by a camera of the mobile unit.

10. The method of claim 1, wherein one or more of the location environmental data and the reference environmental data are detected within a region of a particular spatial environment surrounding the location or the target position within a radius of 100 m.

11. The method of claim 1, wherein the first sensor of the mobile unit comprises a camera, a radar system, a lidar system, an ultrasonic sensor, an infrared sensor, or an ultraviolet sensor provided in the mobile unit.

12. The method of claim 1, wherein:
the first detection region comprising the location environmental data detected using the first sensor of the mobile unit comprises a region projecting outwardly from the mobile unit; and
the second detection region comprising the reference environmental data detected using the second sensor provided at the target position remote from the mobile unit comprises a region projecting outwardly from the target position.

13. The method of claim 1, wherein the specified maximum time offset is at most 2 hours.

14. The method of claim 1, wherein the specified maximum time offset is at most 30 minutes.

15. The method of claim 1, wherein the specified maximum time offset is at most 2 minutes.

16. The method of claim 1, wherein the specified maximum time offset is at most 30 seconds.

17. A system for assisting a locating of a target position remote from a mobile unit carriable by a person, comprising:
a mobile sensor provided in the mobile unit, which mobile sensor is configured to detect location environmental data in a first detection region;
a reference sensor provided at the target position remote from the mobile unit, which reference sensor is configured to detect reference environmental data in a second detection region at the same time or with a specified maximum time offset as a detection of the location environmental data by the mobile sensor;
a processor, which is configured to determine a common environmental feature based on the location environmental data and the reference environmental data;
wherein the common environmental feature is arranged in a region of overlap of the first detection region and in the second detection region;
wherein the location environmental data defines a first appearance of the common environmental feature from a first perspective defined by a first angle of detection from the mobile unit to the common environmental feature;
wherein the reference environmental data defines a second appearance of the common environmental feature from a second perspective defined by a second angle of detection from the target position to the common environmental feature;
wherein the processor is configured to determine a relative arrangement of the mobile unit relative to the target position based at least on a comparison of (a) the first appearance of the common environmental feature from the first perspective defined by the first angle of detection with (b) the second appearance of the common environmental feature from the second perspective defined by the second angle of detection, and based on the relative arrangement of the mobile unit relative to the target position, to generate and output to the person a navigational instruction specifying a route from a current location of the mobile unit to the target position.

18. The system of claim 17, wherein the mobile sensor provided in the mobile unit comprises a camera, a radar system, a lidar system, an ultrasonic sensor, an infrared sensor, or an ultraviolet sensor provided in the mobile unit.

19. The system of claim 17, wherein:

the first detection region comprising the location environmental data detected by the mobile sensor provided in the mobile unit comprises a region projecting outwardly from the mobile unit; and the second detection region comprising the reference environmental data detected by the reference sensor provided at the target position remote from the mobile unit comprises a region projecting outwardly from the target position.

\* \* \* \* \*